United States Patent
Wilson

(10) Patent No.: US 8,800,955 B2
(45) Date of Patent: *Aug. 12, 2014

(54) FLUSH VALVE HANDLE ASSEMBLY PROVIDING DUAL MODE OPERATION

(75) Inventor: John R. Wilson, Naperville, IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,369

(22) Filed: Sep. 19, 2011

(65) Prior Publication Data

US 2012/0005816 A1    Jan. 12, 2012

Related U.S. Application Data

(60) Continuation of application No. 12/543,327, filed on Aug. 18, 2009, now Pat. No. 8,033,522, which is a division of application No. 11/211,273, filed on Aug. 25, 2005, now Pat. No. 7,607,635.

(51) Int. Cl.
*F16K 31/145* (2006.01)
*E03D 3/12* (2006.01)

(52) U.S. Cl.
USPC ................................. 251/40; 4/324

(58) Field of Classification Search
USPC ................... 251/33, 38, 40; 4/324
See application file for complete search history.

(56) References Cited

U.S. PATENT DOCUMENTS

| | | |
|---|---|---|
| 605,621 A | 6/1898 | Acklin |
| 934,353 A | 9/1909 | Prichett |
| 1,114,398 A | 10/1914 | Sloan |
| 1,323,703 A | 12/1919 | Linfoot |
| 1,479,313 A | 9/1924 | Pallavicini |
| 1,519,654 A | 12/1924 | Banta |
| 1,800,608 A | 4/1931 | Dobrick |
| 1,868,520 A | 7/1932 | Brooks |
| 1,868,591 A | 7/1932 | Tanner |
| 1,896,950 A | 2/1933 | Groeniger |
| 1,912,937 A | 6/1933 | George |

(Continued)

FOREIGN PATENT DOCUMENTS

| | | |
|---|---|---|
| WO | WO 2005/124210 | 12/2005 |
| WO | WO 2007/098269 | 8/2007 |

OTHER PUBLICATIONS

U.S. Appl. No. 60/579,398, filed Jun. 14, 2004, Funari.
95/001,187, filed Jul. 10, 2009, Funari.

(Continued)

*Primary Examiner* — John K Fristoe, Jr.
*Assistant Examiner* — Jonathan Waddy
(74) *Attorney, Agent, or Firm* — Foley & Lardner LLP

(57) ABSTRACT

A dual mode flush valve includes a handle assembly having a handle, a bushing and a plunger. The bushing has a sleeve with a passage therethrough for mounting the plunger for sliding and tilting. The passage is defined by first and second partially overlapping bores that coincide at the inner end of the sleeve and are spaced one above the other at the outer end of the sleeve. The bores define a horizontal plunger travel axis and an angled plunger travel axis. Depending on which direction the user actuates the handle the plunger will travel along one of these axes. Travel along the angled axis will lower the plunger tip, allowing earlier clearance of a relief valve and a reduced flow through the flush valve compared to actuation with the plunger travel along the horizontal axis.

16 Claims, 4 Drawing Sheets

(56) References Cited

U.S. PATENT DOCUMENTS

| | | | | |
|---|---|---|---|---|
| 1,992,381 | A | 2/1935 | Lyons | |
| 2,038,135 | A | 4/1936 | Sloan | |
| 2,136,221 | A | 11/1938 | Sloan | |
| 2,164,760 | A | 7/1939 | Wesson | |
| 2,010,860 | A | 8/1940 | Regnell | |
| 2,210,860 | A | 8/1940 | Regnell | |
| 2,369,104 | A | 2/1945 | Frederickson | |
| 2,472,576 | A | 6/1949 | Dobrick | |
| 2,511,545 | A | 6/1950 | Roselair | |
| 2,612,187 | A * | 9/1952 | Romanelli et al. | 251/40 |
| 2,620,826 | A | 12/1952 | Johns | |
| 2,620,828 | A | 12/1952 | Persons | |
| 2,734,712 | A | 2/1956 | Fraser | |
| 2,738,946 | A * | 3/1956 | Filliung | 251/35 |
| 2,775,772 | A | 1/1957 | Clarke | |
| 2,858,846 | A | 11/1958 | Parker | |
| 3,026,536 | A | 3/1962 | Wood | |
| 3,085,779 | A | 4/1963 | Philippe | |
| 3,141,177 | A | 7/1964 | Kertell | |
| 3,207,467 | A | 9/1965 | Bühler | |
| 3,211,416 | A | 10/1965 | Billeter | |
| 3,279,742 | A | 10/1966 | Billeter | |
| 3,334,359 | A | 8/1967 | Weingartner | |
| 3,365,730 | A | 1/1968 | Chiappetta | |
| 3,380,077 | A | 4/1968 | Armstrong | |
| 3,399,860 | A | 9/1968 | Billeter et al. | |
| 3,406,940 | A * | 10/1968 | Kertell | 251/40 |
| 3,419,912 | A | 1/1969 | Kertell | |
| 3,635,103 | A | 1/1972 | Monti | |
| 3,695,254 | A | 10/1972 | Blum | |
| 3,745,591 | A | 7/1973 | Girten | |
| 3,775,778 | A | 12/1973 | Lee | |
| 3,778,023 | A | 12/1973 | Billeter | |
| 3,787,902 | A | 1/1974 | McCombs | |
| 3,806,962 | A * | 4/1974 | Sievers | 137/636.1 |
| 4,022,380 | A | 5/1977 | Scragg | |
| 4,025,968 | A | 5/1977 | Davis | |
| 4,080,669 | A | 3/1978 | Biggerstaff | |
| 4,101,986 | A | 7/1978 | Ng et al. | |
| 4,114,204 | A | 9/1978 | Blach | |
| 4,134,570 | A * | 1/1979 | Walker | 251/40 |
| 4,135,263 | A | 1/1979 | Anderson | |
| 4,160,294 | A | 7/1979 | Crumby | |
| 4,202,525 | A | 5/1980 | Govaer et al. | |
| 4,240,168 | A | 12/1980 | Duke | |
| 4,272,052 | A | 6/1981 | Gidner | |
| 4,327,891 | A | 5/1982 | Allen et al. | |
| 4,576,272 | A | 3/1986 | Morgan, Jr. et al. | |
| 4,817,913 | A | 4/1989 | Whiteside | |
| 4,883,254 | A | 11/1989 | Whiteside | |
| 4,893,645 | A | 1/1990 | Augustinas et al. | |
| 5,026,021 | A | 6/1991 | Pino | |
| 5,062,453 | A | 11/1991 | Saadi et al. | |
| 5,244,179 | A | 9/1993 | Wilson | |
| 5,415,374 | A | 5/1995 | Carroll et al. | |
| 5,431,181 | A | 7/1995 | Saadi et al. | |
| 5,476,244 | A | 12/1995 | Carroll et al. | |
| 5,497,802 | A | 3/1996 | Whiteside | |
| 5,505,427 | A | 4/1996 | Whiteside | |
| 5,535,781 | A | 7/1996 | Paterson et al. | |
| 5,730,415 | A | 3/1998 | Gronwick | |
| 5,881,993 | A | 3/1999 | Wilson et al. | |
| 6,019,343 | A | 2/2000 | Tsai | |
| 6,056,261 | A | 5/2000 | Aparicio et al. | |
| 6,094,753 | A | 8/2000 | Korte | |
| 6,112,763 | A | 9/2000 | Orbell | |
| 6,120,189 | A | 9/2000 | Beagle et al. | |
| 6,173,456 | B1 | 1/2001 | Nieto | |
| 6,178,567 | B1 | 1/2001 | Bliss | |
| 6,189,554 | B1 | 2/2001 | Pino | |
| 6,227,219 | B1 | 5/2001 | Pino | |
| 6,240,826 | B1 | 6/2001 | Zernickel et al. | |
| 6,263,520 | B1 | 7/2001 | Song | |
| 6,282,731 | B1 | 9/2001 | Mohrman | |
| 6,299,127 | B1 | 10/2001 | Wilson | |
| 6,317,899 | B1 | 11/2001 | Brewer | |
| 6,336,229 | B1 | 1/2002 | Guo | |
| 6,385,786 | B1 | 5/2002 | Lester | |
| 6,408,873 | B1 | 6/2002 | Hall et al. | |
| 6,442,772 | B2 | 9/2002 | Han et al. | |
| 6,467,100 | B2 | 10/2002 | Leach | |
| 6,484,327 | B2 | 11/2002 | Hand | |
| 6,510,563 | B1 | 1/2003 | Jarosinski et al. | |
| 6,554,018 | B1 | 4/2003 | Pino | |
| 6,604,249 | B2 | 8/2003 | Han et al. | |
| 6,643,855 | B1 | 11/2003 | Huang | |
| 6,651,265 | B2 | 11/2003 | Kwen | |
| 6,704,945 | B2 | 3/2004 | Bellmore | |
| 6,729,602 | B2 | 5/2004 | Hankin, Jr. et al. | |
| 6,785,913 | B2 | 9/2004 | Ho | |
| 6,823,534 | B2 | 11/2004 | Li | |
| 6,829,787 | B1 | 12/2004 | Pipenburg | |
| 6,898,808 | B2 | 5/2005 | Molho et al. | |
| 6,905,108 | B2 | 6/2005 | Hall et al. | |
| 7,062,801 | B2 | 6/2006 | Oliver | |
| 7,481,413 | B2 | 1/2009 | Funari | |
| 7,607,635 | B2 * | 10/2009 | Wilson | 251/40 |
| 8,033,522 | B2 * | 10/2011 | Wilson | 251/40 |
| 8,042,787 | B2 * | 10/2011 | Wilson | 251/40 |
| 2002/0047102 | A1 | 4/2002 | Hankin et al. | |
| 2003/0089867 | A1 | 5/2003 | Hall et al. | |
| 2003/0110555 | A1 | 6/2003 | Tate | |
| 2004/0262554 | A1 | 12/2004 | Muderlak et al. | |
| 2005/0050625 | A1 | 3/2005 | Bayer | |
| 2006/0033060 | A1 | 2/2006 | Funari | |
| 2006/0151729 | A1 | 7/2006 | Wilson | |
| 2007/0210271 | A1 * | 9/2007 | Wilson | 251/40 |
| 2009/0133186 | A1 | 5/2009 | Maercovich | |
| 2010/0006155 | A1 | 1/2010 | Funari | |
| 2012/0005815 | A1 * | 1/2012 | Wilson | 4/324 |

OTHER PUBLICATIONS

Written Opinion of the International Search Authority and International Search Report for PCT/US2007/004983, mailed Sep. 7, 2007.
International Preliminary Report on Patentability for PCT Application No. PCT/US2007/004983, issued Sep. 2, 2008.
Preliminary Amendment for U.S. Appl. No. 12/543,327, filed Feb. 9, 2010.
Notice of Allowance for U.S. Appl. No. 11/211,273, issued Jul. 9, 2009.
Response to Office Action for U.S. Appl. No. 11/211,273, filed Apr. 22, 2009.
First Office Action for U.S. Appl. No. 11/211,273, mailed Feb. 18, 2009.
Response to Restriction Requirement and Preliminary Amendment for U.S. Appl. No. 11/211,273, filed Jul. 17, 2008.
Restriction Requirement for U.S. Appl. No. 11/211,273, mailed Jul. 8, 2008.
Preliminary Amendment for U.S. Appl. No. 11/211,273, filed Apr. 7, 2006.
Restriction/election requirement Issued for U.S. Appl. No. 11/711,391, Issued Jun. 24, 2009.
Response to Restriction Requirement for U.S. Appl. No. 11/711,391, Filed Jul. 23, 2009.
Office Action Issued for U.S. Appl. No. 11/711,391, Issued Oct. 28, 2009.
Response to Office Action for U.S. Appl. No. 11/711,391, Filed Jan. 28, 2010.
Notice of Allowance for U.S. Appl. No. 11/711,391, Issued May 26, 2010.
Notice of Allowance for U.S. Appl. No. 11/711,391, Issued Sep. 17, 2010.
Request for Continued Application of U.S. Appl. No. 11/711,391, Filed Aug. 25, 2010.
Request for Continued Application of U.S. Appl. No. 11/711,391, Filed Dec. 17, 2010.

* cited by examiner

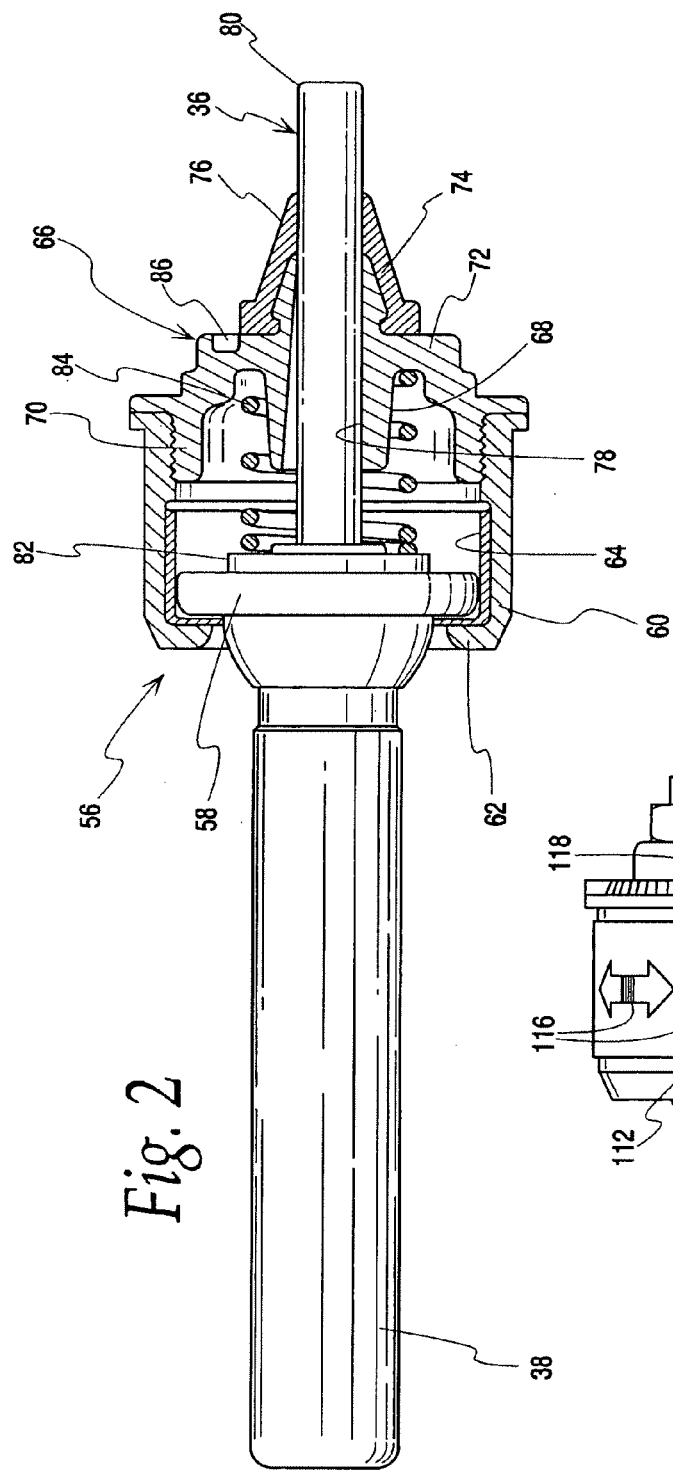

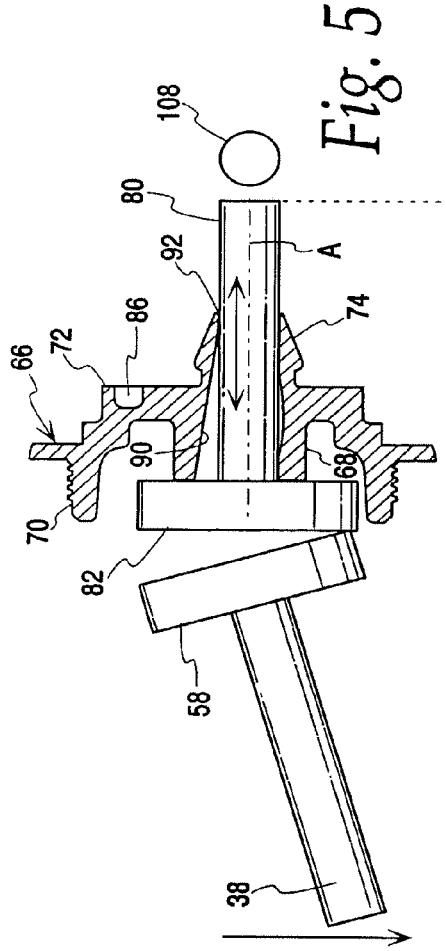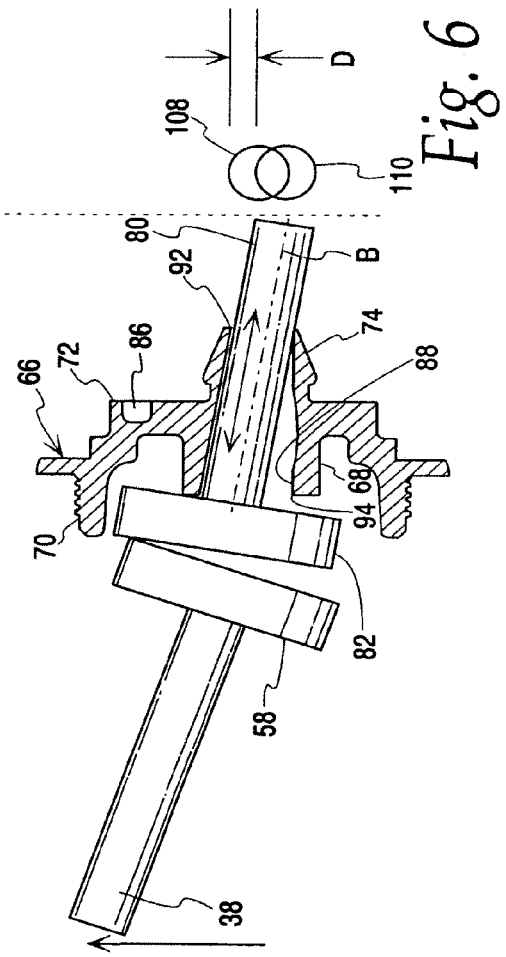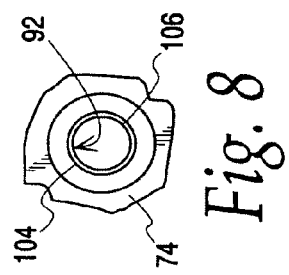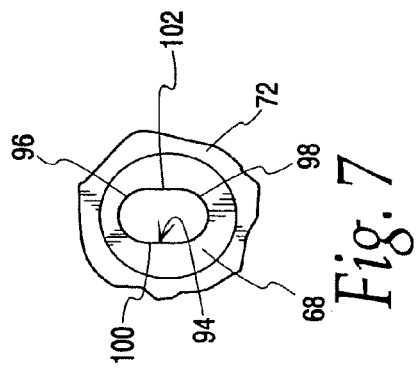

FLUSH VALVE HANDLE ASSEMBLY
PROVIDING DUAL MODE OPERATION

CROSS REFERENCE TO RELATED
APPLICATION

This application is a continuation of U.S. patent application Ser. No. 12/543,327, filed Aug. 18, 2009 now U.S. Pat. No. 8,033,522 which is a Divisional application of U.S. patent application Ser. No. 11/211,273, filed Aug. 25, 2005, now U.S. Pat. No. 7,607,635. These applications are herein incorporated by reference in their entirety.

BACKGROUND OF THE INVENTION

The present invention relates to flush valves for use with plumbing fixtures such as toilets, and more specifically to improvements in the bushing of the actuating handle assembly that will provide for user-selectable, dual mode operation of the flush valve.

Conservation of water resources in the use of toilets can be achieved by allowing a user to select that volume of water required to clean the fixture.

The prior art includes dual mode flush valves. U.S. Pat. No. 2,738,946 has a handle assembly which allows a user to choose either a low volume flush or a full volume flush depending on the axial direction of handle activation. The flush handle assembly includes a plunger having a U-shaped member attached to the inner end thereof. The U-shaped member surrounds the bottom of the relief valve sleeve with legs which have different lengths. Upon activation of the handle one of the U-shaped member's legs will engage the relief valve sleeve and unseat the relief valve. The resulting upward movement of the relief valve will cause the sleeve to clear the leg of the U-shaped member and reseat. Reseating will happen at different times due to the different lengths of the legs. Accordingly, the relief valve reseats either later or sooner depending on which leg engaged the sleeve. Timing of the relief valve closure is one of the factors which governs the length of time the flush valve is open. Therefore the relief valve closure can be used to control how much water flows through the valve during a flush. In this construction the plunger moves only along a horizontal axis regardless of how the handle is actuated. Also, pushing or pulling the handle in a horizontal plane will not activate the valve.

Another attempt to create a dual mode flush valve is shown in U.S. Pat. No. 4,134,570. This valve shows various ways to limit the actuating handle movement, with the intent of limiting the amount of horizontal plunger travel when the user wants to select the minimum flush volume. However, there is no provision for altering the relief valve reseating time. Whether the relief valve sleeve is tilted a small or large amount, the relief valve still cannot reseat until either the diaphragm lifts the sleeve clear of the plunger or the user releases the handle. Therefore, this construction will either fail in practice to produce significant differences in flow volumes or the flow volume will depend on how quickly the user releases the actuating handle. The latter will result in variable and unpredictable flush volumes or incomplete opening of the valve.

SUMMARY OF THE INVENTION

The present invention is directed to a dual mode flush valve which allows the user to select the amount of water that will flow, depending on the amount of water required to clean a fixture. Except for the handle bushing and socket the valve may be conventional. It includes a valve body with an inlet and outlet and a valve seat between the inlet and outlet. A valve member is movable in and out of engagement with the valve seat to open and close the valve. A pressure chamber defined between the valve member and the top of the valve body controls opening and closing of the valve member. A relief valve mounted on the valve member opens and closes the pressure chamber. The relief valve includes a stem and sleeve mounted in telescoping relation. These extend to a point where at least the sleeve is adjacent to a plunger that is actuated by a handle mounted to the valve body.

The plunger is mounted in a bushing. The bushing has a sleeve with a passage defined therein. The plunger extends through the passage. The sleeve has an inner end and an outer end. The passage is defined by first and second bores which partially overlap. The bores coincide at the inner end of the sleeve but are spaced one above the other at the outer end of the sleeve. Thus, the passage has a generally circular opening at the inner end and a somewhat oval shape at the outer end of the sleeve. The bores define a horizontal axis of plunger travel and an angled axis of plunger travel. In a preferred embodiment the angled axis is in a vertical plane with the outer end of the bore at a higher elevation than the inner end of the bore. Thus, when the plunger travels along the angled axis the tip of the plunger contacts the relief valve sleeve at a lower point than is the case when the plunger travels along the horizontal axis. The lower point of contact allows the relief valve sleeve to clear the plunger sooner, resulting in earlier closure of the relief valve and reduced open time for the valve, which of course means a reduced flow amount through the valve.

The flush volumes are selected by choosing the direction of handle actuation. Actuation in an upward vertical direction will tilt the plunger up and cause it to travel on the angled plunger travel axis. This reduces flow as just described. Actuation of the handle in any other direction will not tilt the plunger and it will move in the horizontal axis, resulting in a full flush cycle.

The handle assembly includes a socket that is engageable with the valve body of the flush valve. The socket includes an exterior portion that is visible on the exterior of the valve body when the handle assembly is installed on the valve body. Since the conventional handle assembly is symmetrical about the plunger axis, the handle assembly can be installed on the valve body in any orientation without affecting its performance. However, in the preferred embodiment of the present invention, the handle assembly is not symmetrical about the plunger axis. Instead it has to be installed in a particular orientation for it to perform as intended. The problem is the non-symmetrical portion of the handle assembly is not visible to the installer. Accordingly, in one aspect the present invention provides a mark on the visible portion of the socket that indicates to the installer where the non-symmetrical portion of the bushing passage is. This allows the installer to properly orient the bushing relative to the valve body.

One of the advantages of the present invention is that it allows a user to conserve water while the bushing is compatible with existing valves. Another advantage is it permits the valve to be actuated by pushing or pulling the handle in any direction, which is what most users are accustomed to. Only actuation in a particular direction will result in a reduced flush, but all other directions are still available for a normal or full volume flush. The present invention also utilizes the inherent static forces internal to the handle assembly during activation to bias the plunger's transverse direction. A further advantage of the invention is it uses the existing plunger seat. The bushing geometry where the seal is located is the same as the standard bushing. The plunger traveling on the angled axis will slightly tilt the existing plunger seal but not sufficiently to adversely affect it.

These and other desired benefits of the invention, including combinations of features thereof, will become apparent from the following description. It will be understood, however, that a device could still appropriate the claimed invention without accomplishing each and every one of these desired benefits, including those gleaned from the following description. The appended claims, not these desired benefits, define the subject matter of the invention.

BRIEF DESCRIPTION OF THE DRAWINGS

FIG. 2 is a section through a handle assembly of the present invention.

FIG. 5 is a schematic sectional representation of the handle bushing of the present invention, showing the handle and plunger travel for a full flush.

FIG. 6 is a schematic sectional representation of the handle bushing of the present invention, showing the handle and plunger travel for a partial or reduced volume flush.

FIG. 7 is a schematic end elevation view of the outer end of the handle bushing's sleeve, illustrating the shape of the passage opening at the outer end.

FIG. 8 is a schematic end elevation view of the inner end of the handle bushing's sleeve, illustrating the shape of the passage opening at the inner end.

FIG. 9 is a plan view of an alternate embodiment of the socket, with remaining portions of the handle assembly broken away, showing the mark indicating the location of the tilt portion of the bushing passage.

DETAILED DESCRIPTION OF THE PREFERRED EMBODIMENTS

Figure 1:
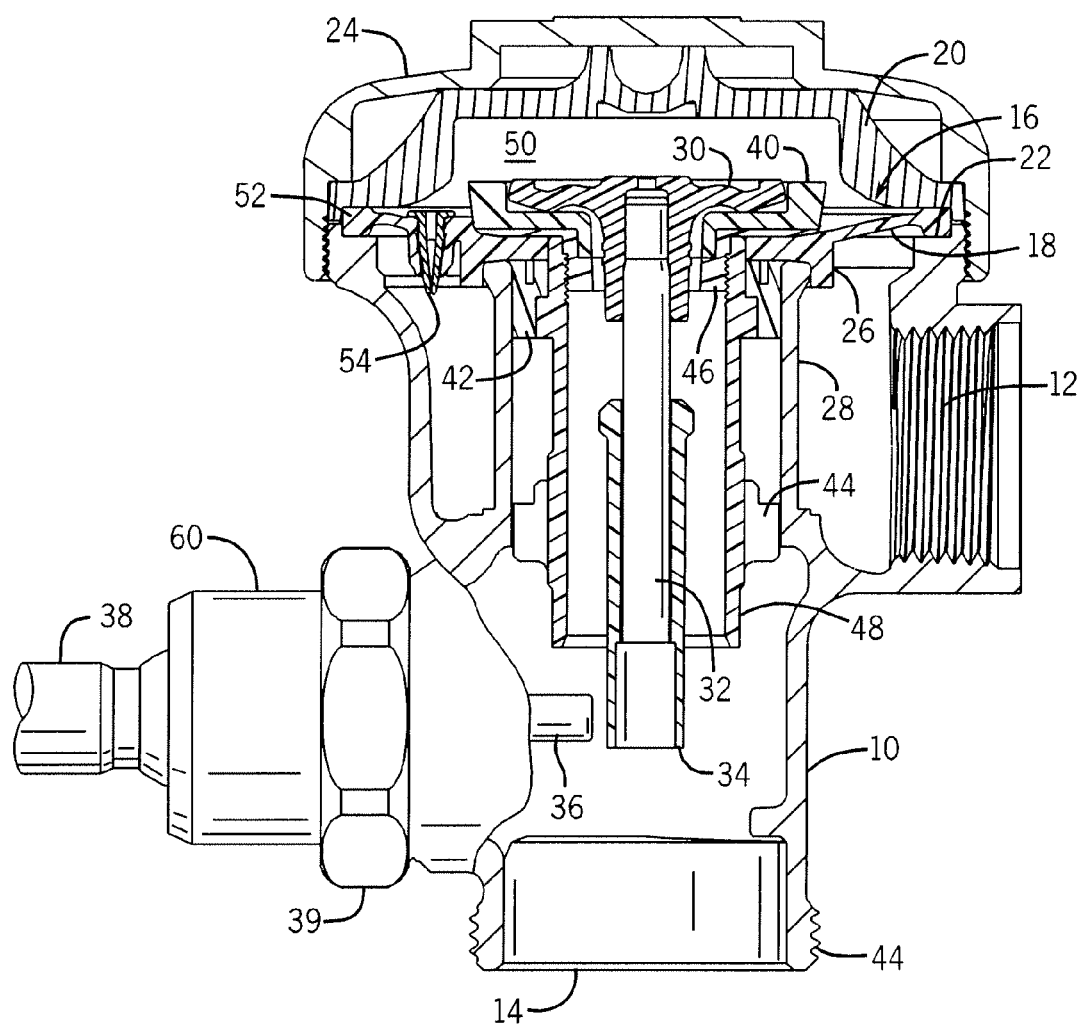
FIG. 1 is a partial section through a flush valve body.

The flush valve of the present invention includes a body 10 having an inlet 12 and an outlet 14. When installed the inlet is connected to a water supply and the outlet is connected to a fixture such as a toilet or urinal. A valve member is indicated generally at 16. In the illustrated embodiment the valve member is a diaphragm assembly but it could be otherwise, such as a piston assembly. The valve member includes a diaphragm 18 peripherally held to the body 10 by an inner cover 20. The diaphragm is seated upon a shoulder 22 at the upper end of body 10 and the peripheral edge 52 of the diaphragm is clamped in this position by the inner cover 20. An outer cover 24 is screw threaded onto the body to hold the inner cover in position.

The diaphragm assembly 16, as shown in FIG. 1, is closed upon a valve seat 26 formed at the upper end of a barrel 28. The barrel 28 forms the fluid conduit connecting the valve seat with outlet 14. The diaphragm assembly 16 includes a relief valve 30 having a downwardly extending stem 32 telescopically carrying a movable sleeve 34. Sleeve 34 is positioned for contact by a plunger 36 when operated by a handle 38. The handle 38 is part of a handle assembly which will be described in further detail below. The handle assembly is retained on the valve body by a nut 39.

The diaphragm assembly 16, in addition to diaphragm 18 and the relief valve 30, includes a retaining disk 40, a refill ring 42 and a flow control ring 44. The underside of the retaining disk 40 is threadedly attached to a collar 46, which in turn is threadedly attached at its exterior to a sleeve 48 which carries the refill ring 42. The above described assembly of elements firmly holds the diaphragm 18 between the upper face of the refill ring 42 and a lower facing surface of the collar 46. Above the diaphragm assembly 16 is a pressure chamber 50 which maintains the diaphragm assembly in a closed position when the flush valve is not in use.

As is known in the art, when the handle 38 is operated, the plunger 36 will contact sleeve 34, tilting the relief valve 30 off its seat on the retaining disk 40. This will permit the discharge of water within the pressure chamber 50 down through the sleeve 48. Inlet pressure will then cause the diaphragm to move upwardly off its seat 26, permitting direct communication between the inlet 12 and the outlet 14 through the space between the bottom of the diaphragm assembly and the seat 26. The raising of the diaphragm 16 also lifts the relief valve sleeve 34, allowing it to clear the plunger 36 even if the user has held the handle 38 in an actuated position. Once the sleeve clears the plunger the relief valve reseats on the retaining disk 40. As soon as this operation has taken place, the pressure chamber 50 will begin to fill through the filter and bypass orifice 54 in the diaphragm assembly. As flow continues into the pressure chamber 50, the diaphragm assembly will move back down toward its valve seat 26 and when it has reached that position, the flush valve will be closed.

Figure 4:
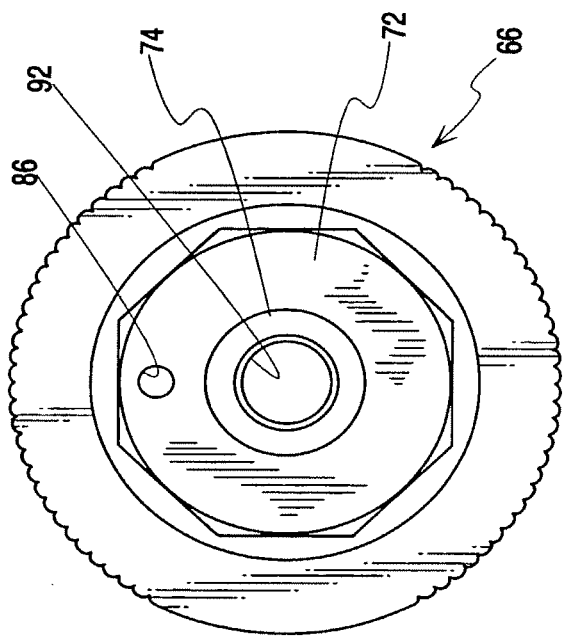
FIG. 4 is a right end elevation view of the handle bushing.
Figure 3:
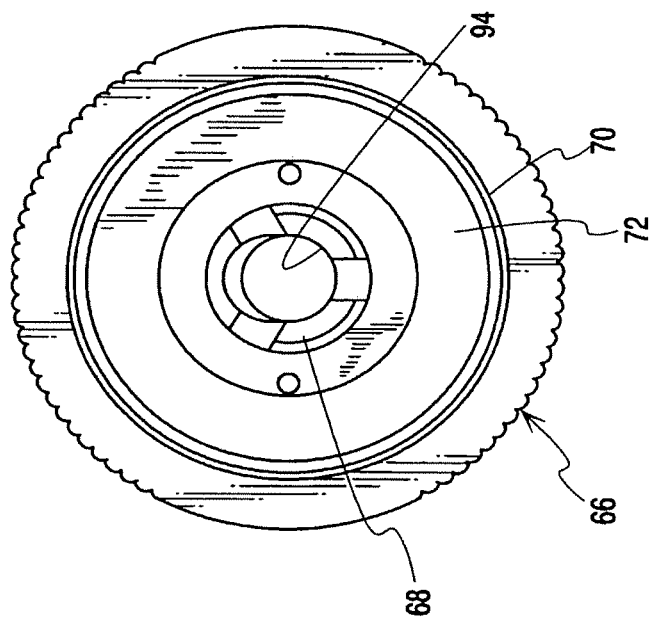
FIG. 3 is a left end elevation view of the handle bushing.

FIGS. 2-4 illustrate the handle assembly 56 of the present invention. The handle assembly fits through an opening in the valve body and is retained therein by the nut 39 (FIG. 1) in the conventional manner. The handle assembly includes the handle 38 which has a face plate 58 at its inner end. The face plate is held within a chamber formed by a handle socket 60. An inwardly extending flange 62 on the socket's outer end retains the handle face plate 58. A sleeve 64 may line the socket chamber and flange 62. The inner end of the socket is threaded to the bushing 66 of the present invention. The bushing has a central sleeve 68 and an outer skirt 70 joined by a wall 72. The skirt 70 is threaded to the socket 60. The inner end of the sleeve has a beveled nose 74 that mounts a handle packing or seal 76. The sleeve has a passage 78 therethrough that receives the shank 80 of the plunger 36. Further details of the passage 78 will be described below. There is a head 82 on the outer end of the plunger shank. The head 82 engages the face plate 58 of the handle. A compression spring 84 or other suitable biasing device fits between the bushing and the head 82 to urge the plunger into engagement with the face plate 58 of handle 38. The wall 72 may also have an indicia thereon which indicates which side of the bushing has the angled axis. The indicia may be in the form of a depression 86 in the wall. Other markings are possible. This will assist the installer in orienting the bushing properly.

Turning now to FIGS. 5-8, details of the bushing's passage 78 are shown. The passage can be considered to be defined by first and second bores 88 and 90 extending through the sleeve 68. The bores are preferably centered on the same vertical plane. The first bore 88 is horizontal and defines a horizontal plunger travel axis A. The second bore 90 is not horizontal. It is tilted upwardly at the outer end of the sleeve and defines an angled plunger travel axis B. The second bore can be considered a tilt portion of the bushing passage 78. The bores preferably each have a diameter slightly greater than that of the plunger shank 80. The bores overlap and merge together at the inner end of the sleeve so that they define a substantially circular opening 92 at the inner end. At the outer end of the sleeve the second bore 90 is above the first bore 88. As seen in FIG. 7, the opening 94 at the outer end of the sleeve includes an upper arcuate portion 96, a lower arcuate portion 98, and a pair of extension portions 100 and 102 joining the upper and lower arcuate portions. The result is a somewhat oval, although not strictly elliptical, shaped opening 94. As seen in FIG. 8, the opening 92 at the inner end of the sleeve includes an upper arcuate portion 104, a lower arcuate portion 106. In a preferred embodiment the height of the extension portions at the opening has shrunk to essentially zero so the arcuate portions 104 and 106 join one another.

It can be seen that the diameter of the plunger is just slightly less than that of the inner opening 92. Thus, the plunger can slide and tilt freely in the opening 92 but it cannot move up, down or sideways appreciably. This contrasts with the opening 94 which permits appreciable up and down movement of the plunger at that point. The result of the combination of the two sleeve bores and their openings is the plunger can tilt up and down as well as slide axially.

The operation of the handle assembly will now be described. FIG. 5 shows the handle in an actuated position where it has been moved down by a user. Downward movement of the handle causes the face plate 58 to pivot about the upper portion of plate (which remains in contact with the socket flange 62) with the lower portion of plate 58 moving to the right, as seen in FIG. 5. This places a force $F_{handle}$ on the lower portion of the plunger head 82. With the noted forces $F_{bushing}$ on the plunger, the plunger remains centered on the horizontal plunger travel axis A. A diagrammatic end view of the plunger shank is shown at 108. FIG. 6 shows the handle in an actuated position where it has been moved up by a user. Upward movement of the handle causes the face plate 58 to pivot about the lower portion of plate with the upper portion of plate 58 moving to the right, as seen in FIG. 6. This places a force $F_{handle}$ on the upper portion of the plunger head 58. With the noted forces $F_{bushing}$ on the plunger, the plunger tilts upward at the left end and downward at the right end, taking the plunger into the second bore 90 where it is aligned with the angled plunger travel axis B. This lowers the inner tip of the plunger. A diagrammatic end view of the plunger tip when on axis B is shown at 110 in FIG. 6. The end view of plunger tip 108 on the horizontal axis A is also represented in FIG. 6 to illustrate the vertical drop D of the plunger tip on axis B as compared to when the plunger travels on axis A.

It can be appreciated by looking at FIG. 1 that dropping the plunger tip to position 110 by angling the plunger shank will permit the sleeve 34 of the relief valve to clear the plunger tip sooner than is the case when the plunger travels on the horizontal axis and the tip is at position 108. As a result of the earlier plunger clearance, the relief valve 30 closes sooner. This allows reestablishment of the pressure in chamber 50 sooner, resulting in earlier closure of the diaphragm and lesser volume per flush cycle. So when the user pushes the handle 38 upwardly, the plunger will be angled downwardly and there will be a reduced flush. When the user pushes the plunger in any direction but up, the plunger will move on the horizontal axis and the full volume flush will result.

Alternate configurations of the bushing passage are possible. For example, instead of having the widened opening of the passage at the outside end of the sleeve, it could be at the inner end. Or, instead of having the lowermost edge of the passage be horizontal and the uppermost edge be angled as shown, this arrangement could be reversed. A further alternative is to provide a sleeve passage with a horizontal axis and an angled axis wherein the inner end of the plunger is angled above horizontal. In that case the horizontal travel, caused by an upward actuation of the handle, would provide the lower flush volume. Similarly, the upwardly angled travel, caused by a downward actuation of the handle, would provide the higher volume flush. Some shortening of the relief valve sleeve might be needed in conjunction with this setup. Yet another possible alternate construction of the bushing passage is to make the inside diameter of the bushing passage appreciably larger than the outside diameter of the plunger. This would cause the plunger to tilt somewhat no matter which direction the handle is actuated, but only tilting in the vertical, plane would affect the volume of the flush.

FIG. 9 illustrates yet another feature of the present invention. As will be evident from the above description, the second bore 90 provides a tilt portion of the bushing passage 78. This produces a non-symmetrical configuration of the passage, as compared to having only a simple, single horizontal bore at 88. This can be seen in FIG. 7. In order to provide the vertical plunger tip drop D illustrated in FIG. 6 with the attendant lower flush volume, the bushing 66 must be installed on the valve body such that the first and second bores 88, 90 are oriented in a generally vertical plane with the second bore 90 on top. However, since the bores are in the interior of the bushing an installer can see neither the bores nor the indicia 86 once the bushing goes into the valve body. The present invention solves this problem by providing an externally-visible mark or indicator 112 showing the location of the second bore. In the illustrated embodiment the mark is simply a line which may be suitably printed on a label that is attached to the exterior portion 114 of the socket 60. The label may optionally carry additional graphics 116 to instruct the user regarding the availability of the reduced flush alternative. Instead of a label, the mark 112 could be engraved or otherwise formed directly on the socket. The mark 112 can be used in conjunction with the indicia 86 on the bushing 66. That is, at the time of installation of the handle assembly on to the valve body, the installer can look to ensure that the mark 112 is rotationally aligned with the indicia 86 and then make sure that the mark 112 is at the top of the handle assembly when the nut 39 is tightened. This will result in the bushing passage 78 having the proper orientation relative to the valve body 10 and relief valve sleeve 34. Further assurance of proper alignment may be added by placing a flat 118 on the external flange of the bushing. Aligning the mark 112 with the flat 116 during assembly of the handle and then placing the mark at the top of the handle during installation of the handle assembly will result in the correct orientation.

While the preferred form of the invention has been shown and described herein, it should be realized that there may be many modifications, substitutions and alterations thereto. For example, the arcuate portions 96 and/or 98 may be fully semi-circular or they could extend somewhat less than a full 180°. Also, while a circular cross section for the plunger shank and the opening 92 is preferred, it could be otherwise so long as the plunger is free to slide.

I claim:

1. A handle assembly for a dual mode flush valve, the handle assembly comprising:
    a handle having a handle face plate for engaging a plunger;
    the plunger having a face plate and a shank having an end for engaging a valve stem;
    a bushing with a passage therethrough having a first opening larger than a second opening;
    the plunger shank being slidably and tiltably disposed within the bushing passage; and
    the bushing passage defining a solid waste plunger travel axis and a liquid waste plunger travel axis, the solid waste plunger travel axis and the liquid waste plunger travel axis being non-parallel.

2. The bushing of claim 1, wherein the plunger shank is tiltable at least partially within the passage causing the plunger shank end to vertically drop relative to the bushing.

3. The bushing of claim 1, wherein the first opening is oval and the second opening is circular.

4. The bushing of claim 1, wherein the bushing passage is nonsymmetrical.

5. A method of operating a dual mode flush valve having a plunger engageable with a bushing, the plunger having a plunger head and a plunger shank extending therefrom, the method comprising:
selecting one flush volume from the group consisting of a solid waste flush volume and a liquid flush volume;
if the solid waste flush volume is selected, exerting a $F_{handle}$ force on a lower portion of the plunger head and sliding the plunger through a passage of the bushing of the dual mode flush valve;
if the liquid flush volume is selected, exerting a $F_{handle}$ force on an upper portion of the plunger head and tilting and sliding the plunger through the passage of the bushing of the dual mode flush valve; and
lowering the plunger shank end as the plunger tilts and slides through the passage of the bushing.

6. A dual mode flush valve, comprising:
a body having an inlet and an outlet;
a valve seat between said inlet and outlet;
a valve member movable to a closing position on said valve seat to control water flow between said inlet and outlet;
a pressure chamber defined in said body above said valve member;
a relief valve mounted on the valve member and having a valve stem extending therefrom and engageable by a plunger for movement between seated and unseated positions which close and open the pressure chamber, respectively;
a handle assembly mounted on the body;
the handle assembly including a handle engageable with the plunger and a bushing;
the bushing having a nonsymmetrical passage defined therethrough and the plunger slidably and tiltably mounted in said bushing passage, the plunger having an outer end in engagement with the handle and an inner end engageable with the relief valve, the plunger being movable to unseat the relief valve, the bushing passage defining a first axis of plunger travel and a second axis of plunger travel;
the first axis of plunger travel aligning the plunger to engage the valve stem at a first position;
the second axis of plunger travel, which is angled with respect to the first axis of plunger travel, aligning the plunger to engage the valve stem at a second position; and
a mark disposed on the handle assembly indicative of an orientation of the bushing passage;
wherein the dual mode flush valve has a first flush volume for liquid waste corresponding to the tilting of the handle in a first direction and a second flush volume for solid waste corresponding to a tilting of the handle in any other direction other than the first direction.

7. The dual mode flush valve of claim 6, wherein the first position on the valve stem is above the second position on the valve stem.

8. The dual mode flush valve of claim 6, wherein the plunger is tiltable at least partially within the passage causing the inner end to have a vertical drop relative to the bushing.

9. The dual mode flush valve of claim 6, wherein the bushing has a first passage opening that is oval and a second passage opening that is circular.

10. A dual mode flush valve handle assembly comprising an actuation mechanism configured to be coupled to a flush valve body;
a bushing coupled to the actuation mechanism;
a plunger having a plunger head disposable between the bushing and the actuation mechanism and a plunger shank at least partially slidably disposed in the bushing;
the bushing having a solid waste axis of plunger travel and a liquid waste axis of plunger travel through the bushing,
wherein a bottom portion of the plunger head is engageable by the actuation mechanism positioning the plunger along the solid waste axis and a top portion of the plunger head engageable by the actuation mechanism positioning the plunger along the liquid waste axis, the liquid waste axis tilted with respect to the solid waste axis.

11. A dual mode water flush valve including a valve body, a stem for releasing water when the stem is displaced, a bushing, a plunger mounted in the bushing, the dual mode water flush valve having a solid waste mode to release a full flush volume of water required to evacuate solid waste and having a liquid waste mode to release a reduced flush volume of water reduced in volume relative to the full flush volume, wherein the improvement comprises:
the plunger configured to travel along a first direction of travel to displace the stem when the plunger is actuated in the solid waste mode and to travel along a second direction of travel to displace the stem when the plunger is actuated in the liquid waste mode;
one or more visual indicia on the dual mode water flush valve to provide a user a choice of selecting to actuate the plunger to move in the first direction of travel correlated with the visual indicia to provide the full flush volume of water or to actuate the plunger to move in the second direction of travel correlated with the indicia to provide the reduced flush volume of water and said bushing having a passage which is constructed as a preformed bushing passage to thereby allow the plunger to move in the second direction of travel and also tilt within the preformed bushing passage to release the reduced flush volume of water which is adequate to evacuate liquid waste.

12. The water flush valve as defined in claim 11 wherein the first direction of travel and the second direction of travel follow non-parallel paths.

13. A method of assembling a dual mode flush valve, comprising:
engaging a plunger having a plunger head and plunger shank with a bushing having a first axis of plunger travel and a second axis of plunger travel angled with respect to the first axis of plunger travel, the plunger shank disposed within the bushing;
securing a handle socket to the bushing with a face plate of a handle disposed within the handle socket and the plunger head disposed adjacent the handle face plate within the handle socket; and
determining the location of the second axis of plunger travel and providing a visual indicia characteristic of the location of the second axis of plunger travel.

14. The method of claim 13, wherein the first axis of plunger travel is horizontal.

15. The method of claim 13, wherein the first axis of plunger travel is not horizontal.

16. A method of manufacturing a dual mode water flush valve including a valve body, a stem for releasing water when the stem is displaced, a bushing, a plunger mounted in the bushing, the dual mode flush valve having a full flush volume of water required to evacuate solid waste and a reduced flush volume of water, the method comprising:
creating a first path of plunger travel in the bushing configured so the plunger strikes the stem at a first vertical location when the plunger is actuated to release the full flush volume of water and creating a second path of plunger travel in the bushing configured so the plunger strikes the stem at a second vertical location when the plunger is actuated to release the reduced flush volume of water.

* * * * *